US011531558B2

(12) United States Patent
Alexandrian et al.

(10) Patent No.: US 11,531,558 B2
(45) Date of Patent: Dec. 20, 2022

(54) SYSTEM FOR HYBRID COMPUTING APPLICATION WITH DESKTOP AND WEB-BASED COMPONENTS

(71) Applicant: Bank of America Corporation, Charlotte, NC (US)

(72) Inventors: Jason Nicholas Alexandrian, Fleming Island, FL (US); Luis Felipe Lecaro Saborio, Frisco, TX (US)

(73) Assignee: BANK OF AMERICA CORPORATION, Charlotte, NC (US)

( * ) Notice: Subject to any disclaimer, the term of this patent is extended or adjusted under 35 U.S.C. 154(b) by 232 days.

(21) Appl. No.: 16/934,545

(22) Filed: Jul. 21, 2020

(65) Prior Publication Data

US 2022/0027177 A1    Jan. 27, 2022

(51) Int. Cl.
| | | |
|---|---|---|
| G06F 9/451 | (2018.01) | |
| G06F 9/455 | (2018.01) | |
| G06F 9/445 | (2018.01) | |
| G06F 9/54 | (2006.01) | |
| G06F 17/00 | (2019.01) | |

(52) U.S. Cl.
CPC .......... *G06F 9/452* (2018.02); *G06F 9/44521* (2013.01); *G06F 9/45529* (2013.01); *G06F 9/54* (2013.01)

(58) Field of Classification Search
CPC .. G06F 9/452; G06F 9/44521; G06F 9/45529; G06F 9/54
See application file for complete search history.

(56) References Cited

U.S. PATENT DOCUMENTS

| | | | |
|---|---|---|---|
| 9,201,671 B2 * | 12/2015 | Vincent | G06F 9/45558 |
| 9,336,332 B2 | 5/2016 | Davis et al. | |
| 9,392,077 B2 | 7/2016 | Borzycki et al. | |
| 9,471,441 B1 | 10/2016 | Lyadvinsky et al. | |
| 9,471,553 B2 | 10/2016 | Ligman et al. | |
| 9,576,240 B2 | 2/2017 | Jeong et al. | |
| 9,578,088 B2 | 2/2017 | Nickolov et al. | |
| 9,690,632 B2 | 6/2017 | Wong et al. | |
| 9,851,953 B2 | 12/2017 | Straub et al. | |
| 10,007,710 B2 | 6/2018 | Chen et al. | |
| 10,033,833 B2 | 7/2018 | Fu et al. | |
| 10,162,805 B2 | 12/2018 | Grigorovitch et al. | |
| 10,216,490 B2 | 2/2019 | Eksten et al. | |
| 10,225,335 B2 | 3/2019 | Fu et al. | |
| 10,235,439 B2 | 3/2019 | Sullivan et al. | |

(Continued)

*Primary Examiner* — Quoc A Tran
(74) *Attorney, Agent, or Firm* — Moore & Van Allen PLLC; Seongun M. Hong

(57) ABSTRACT

A system is provided for a hybrid computing application with desktop and web-based components. In particular, the system may comprise a desktop application comprising a user interface which may be configured to load and display one or more embedded web-based components along with one or more desktop application components. The web-based components may access data within the application ("application data"), and conversely, the application may access data within the web-based components ("web-based data"). The bidirectional interface of the application and web-based components may allow the user to seamlessly access all relevant functions of the application and web-based components within a unified graphical interface.

20 Claims, 2 Drawing Sheets

(56) References Cited

U.S. PATENT DOCUMENTS

| | | |
|---|---|---|
| 10,241,843 B2 | 3/2019 | Kaplinger et al. |
| 10,430,511 B2 | 10/2019 | Wolfram et al. |
| 10,594,582 B2 | 3/2020 | Joshi et al. |
| 10,628,578 B2 | 4/2020 | Eksten et al. |
| 10,693,743 B2 | 6/2020 | Zhong et al. |
| 11,157,259 B1 * | 10/2021 | Lin .......................... G06F 8/38 |
| 2018/0041588 A1 | 2/2018 | Straub et al. |
| 2018/0203839 A1 * | 7/2018 | Myren .................. G06F 40/186 |
| 2019/0179805 A1 | 6/2019 | Prahlad et al. |
| 2019/0208003 A1 | 7/2019 | Lang et al. |

\* cited by examiner

200

```
┌─────────────────────────────────────────────────────────────┐
│   PRESENT, ON A DISPLAY OF A USER COMPUTING SYSTEM, A       │
│       GRAPHICAL INTERFACE OF A HYBRID APPLICATION            │
│                           201                                │
└─────────────────────────────────────────────────────────────┘
                              ↓
┌─────────────────────────────────────────────────────────────┐
│   RECEIVE, FROM THE USER COMPUTING SYSTEM, A REQUEST TO     │
│     ACCESS A FIRST FUNCTION OF THE HYBRID APPLICATION        │
│                           202                                │
└─────────────────────────────────────────────────────────────┘
                              ↓
┌─────────────────────────────────────────────────────────────┐
│     PRESENT, ON THE GRAPHICAL INTERFACE OF THE HYBRID       │
│   APPLICATION, A FIRST TAB, WHEREIN THE FIRST TAB COMPRISES A│
│   DESKTOP APPLICATION ASSOCIATED WITH THE FIRST FUNCTION     │
│                 OF THE HYBRID APPLICATION                    │
│                           203                                │
└─────────────────────────────────────────────────────────────┘
                              ↓
┌─────────────────────────────────────────────────────────────┐
│   RECEIVE, FROM THE USER COMPUTING SYSTEM, A REQUEST TO     │
│    ACCESS A SECOND FUNCTION OF THE HYBRID APPLICATION        │
│                           204                                │
└─────────────────────────────────────────────────────────────┘
                              ↓
┌─────────────────────────────────────────────────────────────┐
│     PRESENT, ON THE GRAPHICAL INTERFACE OF THE HYBRID       │
│   APPLICATION, A SECOND TAB, WHEREIN THE SECOND TAB          │
│   COMPRISES A WEB-BASED APPLICATION ASSOCIATED WITH THE      │
│      SECOND FUNCTION OF THE HYBRID APPLICATION               │
│                           205                                │
└─────────────────────────────────────────────────────────────┘
```

FIG. 2

SYSTEM FOR HYBRID COMPUTING APPLICATION WITH DESKTOP AND WEB-BASED COMPONENTS

FIELD OF THE INVENTION

The present disclosure embraces a system for a hybrid computing application with desktop and web-based components.

BACKGROUND

There is a need for an efficient way to provide full application functionality in the context of software migration.

BRIEF SUMMARY

The following presents a simplified summary of one or more embodiments of the invention in order to provide a basic understanding of such embodiments. This summary is not an extensive overview of all contemplated embodiments, and is intended to neither identify key or critical elements of all embodiments, nor delineate the scope of any or all embodiments. Its sole purpose is to present some concepts of one or more embodiments in a simplified form as a prelude to the more detailed description that is presented later.

A system is provided for a hybrid computing application with desktop and web-based components. In particular, the system may comprise a desktop application comprising a user interface which may be configured to load and display one or more embedded web-based components along with one or more desktop application components. The web-based components may access data within the application ("application data"), and conversely, the application may access data within the web-based components ("web-based data"). The bidirectional interface of the application and web-based components may allow the user to seamlessly access all relevant functions of the application and web-based components within a unified graphical interface.

Accordingly, embodiments of the present disclosure provide a system for a hybrid computing application with desktop and web-based components. The system may comprise a memory device with computer-readable program code stored thereon; a communication device; and a processing device operatively coupled to the memory device and the communication device. The processing device may be configured to execute the computer-readable program code to present, on a display of a user computing system, a graphical interface of a hybrid application; receive, from the user computing system, a request to access a first function of the hybrid application; present, on the graphical interface of the hybrid application, a first tab, wherein the first tab comprises a desktop application associated with the first function of the hybrid application; receive, from the user computing system, a request to access a second function of the hybrid application; and present, on the graphical interface of the hybrid application, a second tab, wherein the second tab comprises a web-based application associated with the second function of the hybrid application.

In some embodiments, the computer-readable program code further causes the processing device to detect user activity within the second tab, wherein the user activity is associated with a third function of the hybrid application; and present, on the graphical interface of the hybrid application, a third tab, wherein the third tab comprises a desktop application associated with the third function of the hybrid application.

In some embodiments, the user activity within the second tab comprises interacting with an interface element within the second tab.

In some embodiments, the web-based application associated with the second function of the hybrid application is configured to access data from the desktop application associated with the first function of the hybrid application, wherein the web-based application automatically populates one or more data fields within the second tab using the data from the desktop application.

In some embodiments, the desktop application associated with the first function of the hybrid application is configured to access data from the web-based application associated with the second function of the hybrid application, wherein the desktop application automatically populates one or more data fields within the first tab using the data from the web-based application.

In some embodiments, presenting the second tab comprises detecting that the web-based application associated with the second function of the hybrid application is compatible with a first web browser; switching an embedded web browser of the hybrid application to the first web browser; and automatically loading the web-based application in the embedded web browser.

In some embodiments, detecting that the web-based application is compatible with the first web browser comprises accessing a web application lookup database, wherein the web application lookup database indicates that the web-based application is compatible with the first web browser.

Embodiments of the present disclosure also provide a computer program product for a hybrid computing application with desktop and web-based components, the computer program product comprising at least one non-transitory computer readable medium having computer-readable program code portions embodied therein. The computer-readable program code portions may comprise executable code portions for presenting, on a display of a user computing system, a graphical interface of a hybrid application; receiving, from the user computing system, a request to access a first function of the hybrid application; presenting, on the graphical interface of the hybrid application, a first tab, wherein the first tab comprises a desktop application associated with the first function of the hybrid application; receiving, from the user computing system, a request to access a second function of the hybrid application; and presenting, on the graphical interface of the hybrid application, a second tab, wherein the second tab comprises a web-based application associated with the second function of the hybrid application.

In some embodiments, the computer-readable program code portions further comprise executable code portions for detecting user activity within the second tab, wherein the user activity is associated with a third function of the hybrid application; and presenting, on the graphical interface of the hybrid application, a third tab, wherein the third tab comprises a desktop application associated with the third function of the hybrid application.

In some embodiments, the user activity within the second tab comprises interacting with an interface element within the second tab.

In some embodiments, the web-based application associated with the second function of the hybrid application is configured to access data from the desktop application associated with the first function of the hybrid application, wherein the web-based application automatically populates one or more data fields within the second tab using the data from the desktop application.

In some embodiments, the desktop application associated with the first function of the hybrid application is configured to access data from the web-based application associated with the second function of the hybrid application, wherein the desktop application automatically populates one or more data fields within the first tab using the data from the web-based application.

In some embodiments, presenting the second tab comprises detecting that the web-based application associated with the second function of the hybrid application is compatible with a first web browser; switching an embedded web browser of the hybrid application to the first web browser; and automatically loading the web-based application in the embedded web browser.

Embodiments of the present disclosure also provide a computer-implemented method for a hybrid computing application with desktop and web-based components. The computer-implemented method may comprise presenting, on a display of a user computing system, a graphical interface of a hybrid application; receiving, from the user computing system, a request to access a first function of the hybrid application; presenting, on the graphical interface of the hybrid application, a first tab, wherein the first tab comprises a desktop application associated with the first function of the hybrid application; receiving, from the user computing system, a request to access a second function of the hybrid application; and presenting, on the graphical interface of the hybrid application, a second tab, wherein the second tab comprises a web-based application associated with the second function of the hybrid application.

In some embodiments, the computer-implemented method further comprises detecting user activity within the second tab, wherein the user activity is associated with a third function of the hybrid application; and presenting, on the graphical interface of the hybrid application, a third tab, wherein the third tab comprises a desktop application associated with the third function of the hybrid application.

In some embodiments, the user activity within the second tab comprises interacting with an interface element within the second tab.

In some embodiments, the web-based application associated with the second function of the hybrid application is configured to access data from the desktop application associated with the first function of the hybrid application, wherein the web-based application automatically populates one or more data fields within the second tab using the data from the desktop application.

In some embodiments, the desktop application associated with the first function of the hybrid application is configured to access data from the web-based application associated with the second function of the hybrid application, wherein the desktop application automatically populates one or more data fields within the first tab using the data from the web-based application.

In some embodiments, presenting the second tab comprises detecting that the web-based application associated with the second function of the hybrid application is compatible with a first web browser; switching an embedded web browser of the hybrid application to the first web browser; and automatically loading the web-based application in the embedded web browser.

In some embodiments, detecting that the web-based application is compatible with the first web browser comprises accessing a web application lookup database, wherein the web application lookup database indicates that the web-based application is compatible with the first web browser.

The features, functions, and advantages that have been discussed may be achieved independently in various embodiments of the present invention or may be combined with yet other embodiments, further details of which can be seen with reference to the following description and drawings.

BRIEF DESCRIPTION OF THE DRAWINGS

Figure 1:
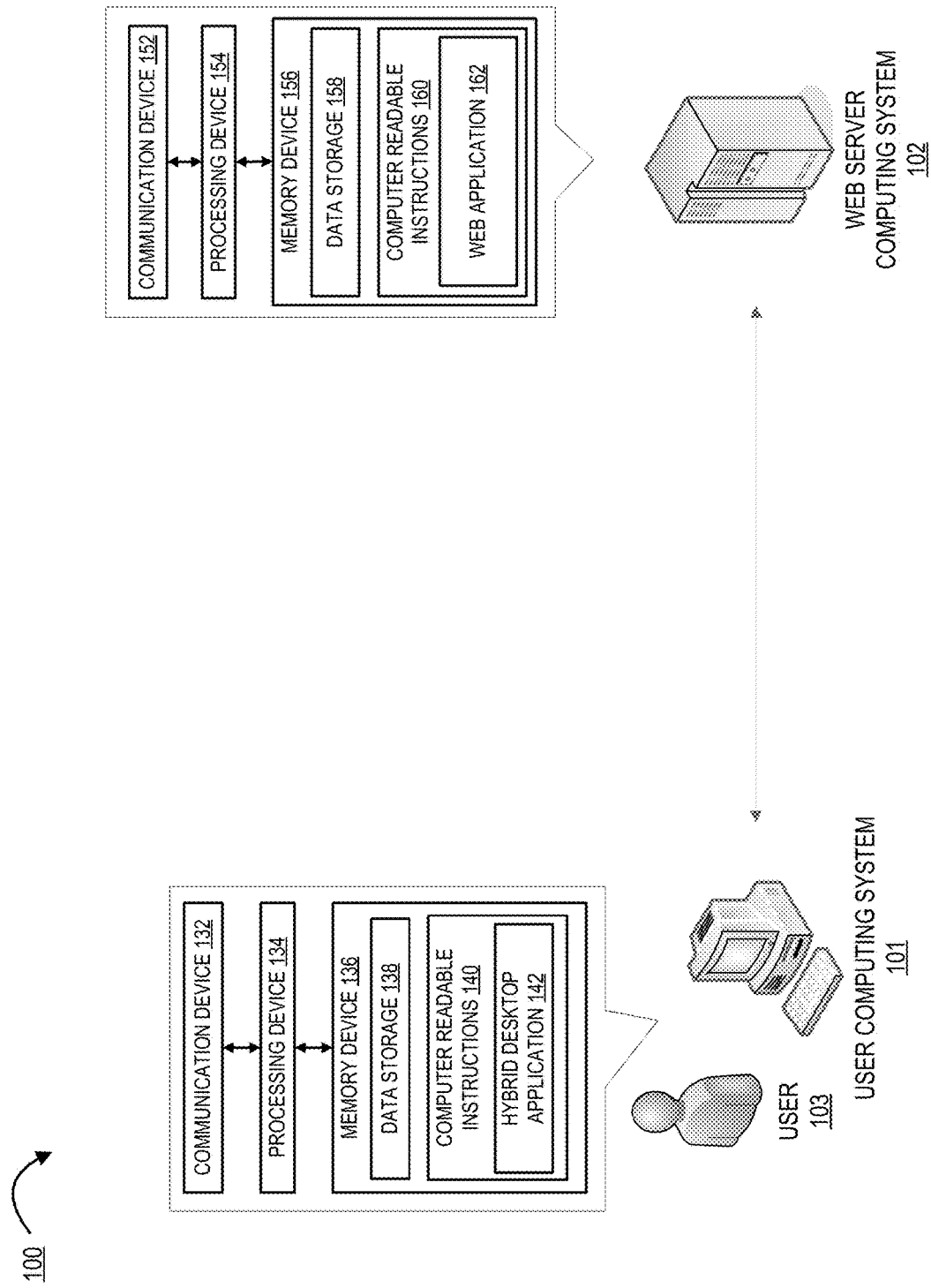

Having thus described embodiments of the invention in general terms, reference will now be made to the accompanying drawings, wherein:

FIG. 1 illustrates an operating environment for the hybrid computing application system, in accordance with one embodiment of the present disclosure; and FIG. 2 illustrates a process flow for the hybrid computing application system, in accordance with one embodiment of the present disclosure.

DETAILED DESCRIPTION OF EMBODIMENTS OF THE INVENTION

Embodiments of the present invention will now be described more fully hereinafter with reference to the accompanying drawings, in which some, but not all, embodiments of the invention are shown. Indeed, the invention may be embodied in many different forms and should not be construed as limited to the embodiments set forth herein; rather, these embodiments are provided so that this disclosure will satisfy applicable legal requirements. Like numbers refer to elements throughout. Where possible, any terms expressed in the singular form herein are meant to also include the plural form and vice versa, unless explicitly stated otherwise. Also, as used herein, the term "a" and/or "an" shall mean "one or more," even though the phrase "one or more" is also used herein.

"Entity" as used herein may refer to an individual or an organization that owns and/or operates an online system of networked computing devices, systems, and/or peripheral devices on which the system described herein is implemented. The entity may be a business organization, a non-profit organization, a government organization, and the like, which may routinely use various types of applications within its enterprise environment to accomplish its organizational objectives.

"Entity system" as used herein may refer to the computing systems, devices, software, applications, communications hardware, and/or other resources used by the entity to perform the functions as described herein. Accordingly, the entity system may comprise desktop computers, laptop computers, servers, Internet-of-Things ("IoT") devices, networked terminals, mobile smartphones, smart devices (e.g., smart watches), network connections, and/or other types of computing systems or devices and/or peripherals along with their associated applications.

"Computing system" or "computing device" as used herein may refer to a networked computing device within the entity system. The computing system may include a processor, a non-transitory storage medium, a communications device, and a display. The computing system may be configured to support user logins and inputs from any combination of similar or disparate devices. Accordingly, the computing system may be a portable electronic device such as a smartphone, tablet, single board computer, smart device, or laptop. In other embodiments, the computing system may be a stationary unit such as a personal desktop computer, networked terminal, IoT device, or the like.

"User" as used herein may refer to an individual who may interact with the entity system to access the functions therein. Accordingly, the user may be an agent, employee, associate, contractor, or other authorized party who may access, use, administrate, maintain, and/or manage the computing systems within the entity system. In other embodiments, the user may be a client or customer of the entity.

Accordingly, the term "user device" or "mobile device" may refer to mobile phones, personal computing devices, tablet computers, wearable devices, and/or any stationary or portable electronic device capable of receiving and/or storing data therein.

"Desktop application" as used herein may refer to a software application which may be configured to be executed locally on a user's computing system (e.g., a desktop computer). Accordingly, in some embodiments, the desktop application may be a compiled binary executable.

"Web-based application" as used herein may refer to a software application which may be configured to be executed from a remote server. Accordingly, a web server may be configured to host the web-based application, which may be accessed by one or more client systems.

When migrating certain applications from a desktop environment to a web-based environment, it may become necessary to migrate subsets of application components at a time. For instance, it may not be feasible to migrate the functions of particularly large applications at once. In this regard, the system as described herein may provide a hybrid application which may integrate one or more desktop components and one or more web-based components into a single, unified application. The hybrid application may comprise a graphical user interface through which the user may access the various functions of the hybrid application. In some embodiments, the graphical user interface may comprise one or more tabs, where each tab may be configured to display a particular component of the hybrid application. Accordingly, each tab may function as a container that may be used to display either a desktop component or a web-based component. A tab that is used to display a desktop component may access a locally stored set of functions to provide application functionality, whereas a tab that is used to display a web-based component may access a web-based application stored on a web server.

In some embodiments, the web-based application may take the form of a website. In such embodiments, a tab may be configured to call an embedded web browser which may be populated using the information within the web server. The embedded web browser functionality may be configured to be modular such that the web browser used may be switched based on which browser is optimally compatible with the website to be loaded. In this regard, the browser switching may be executed by the hybrid application automatically (e.g., based on webpage metadata, a reference table of web apps, or the like) to ensure that the webpage elements are properly presented to the user. In this way, the hybrid application may provide a seamless experience for the user such that the user may not be aware of which tabs are used to execute desktop components and which are used to execute web-based components.

In some embodiments, the hybrid application may include bidirectional communication between the desktop components and the web-based components. For instance, the data that is processed by a web-based component as a part of its functionality may be accessible by the desktop components of the hybrid application. Conversely, data that is processed by a desktop component may be accessible by the web-based components of the hybrid application. By providing bidirectional communication between the various components, the hybrid application may in turn provide a unified user experience with integrated functionality of disparate components.

An exemplary embodiment is provided for illustrative purposes. In one embodiment, an entity such as a financial institution may initiate a web migration of an application used to process customer data and/or manage communications with the customer (e.g., via e-mail, telephone, videoconference, or the like). In such an embodiment, the system may provide a hybrid application in which certain functions are provided by desktop components (e.g., customer accounts, communications with the customer) while others are provided by web-based components (e.g., viewing a customer's transaction history). The hybrid application may display the desktop component in a first tab within a graphical user interface, where the executable code for the desktop component is stored locally on a user's computing system (e.g., a computing system operated by an agent or employee of the entity). The hybrid application may further display the web-based component in a second tab within the graphical user interface, where the executable code for the web-based component is stored remotely on a web server. In such a configuration, the user may be able to switch freely between the first tab (running desktop components) and the second tab (running web-based components) seamlessly within the hybrid application.

For example, the user may click on a particular customer's account within the second tab (running an accounts manager application). The hybrid application may open a second tab to display the selected customer's transaction data, where the second tab comprises an embedded web browser application which is configured to display a web page corresponding to the customer's transaction data. Upon reviewing the transaction data, the user may wish to contact the customer to inquire about a certain transaction. The web-based component may comprise a pane containing the customer's contact information (e.g., telephone number, e-mail address, and the like). The customer's contact information may further comprise an interactive link (e.g., clickable hyperlink, clickable button, or the like) which may automatically place a system call to one or more desktop components which handle communications with a customer. For instance, if the user clicks on a link associated with the customer's e-mail address, the system may open a new tab in which a desktop e-mail application is displayed. The desktop e-mail application may display an outgoing e-mail form which may be prepopulated with the data within the web-based component (e.g., the customer's e-mail address).

The system as described herein confers a number of technological advantages over conventional methods of performing application migration. For instance, combining both desktop and web-based functionality into a unified hybrid application greatly improves the usability of the application by providing a seamless application for the user at all stages of the application migration process. Furthermore, by providing bidirectional communication between desktop and web-based components, the system may reduce the possibility of divergences in data sets that may occur from maintaining separate data sets for desktop and web-based applications (e.g., by user error, data corruption, or the like).

Turning now to the figures, FIG. 1 illustrates an operating environment 100 for the hybrid computing application system, in accordance with one embodiment of the present disclosure. In particular, FIG. 1 illustrates a user computing system 101 that is operatively coupled, via a network, to a web server computing system 102. In such a configuration, the user computing system 101 may transmit information to and/or receive information from the web server computing system 102. It should be understood that FIG. 1 illustrates only an exemplary embodiment of the operating environment 100, and it will be appreciated that one or more functions of the systems, devices, or servers as depicted in FIG. 1 may be combined into a single system, device, or server. Furthermore, a single system, device, or server as depicted in FIG. 1 may represent multiple systems, devices, or servers. For instance, though the user computing system 101 and the web server computing system 102 are each represented as single units in FIG. 1, the operating environment 100 may comprise multiple user computing systems and multiple web server computing systems.

The network may be a system specific distributive network receiving and distributing specific network feeds and identifying specific network associated triggers. The network may include one or more cellular radio towers, antennae, cell sites, base stations, telephone networks, cloud networks, radio access networks (RAN), WiFi networks, or the like. Additionally, the network may also include a global area network (GAN), such as the Internet, a wide area network (WAN), a local area network (LAN), or any other type of network or combination of networks. Accordingly, the network may provide for wireline, wireless, or a combination wireline and wireless communication between devices on the network.

The user computing system 101 may be a computing system that is operated by a user 103, where the user 103 may be an agent or employee of an entity which hosts the operating environment 100. Accordingly, the user computing system 101 may be a desktop, laptop, smart device, single board computer, or the like. The user computing system 101 may comprise a processing device 134 operatively coupled to a communication device 132 and a memory device 136, where the memory device 136 may comprise data storage 138 and computer readable instructions 140. As used herein, the term "processing device" generally includes circuitry used for implementing the communication and/or logic functions of the particular system. For example, a processing device may include a digital signal processor device, a microprocessor device, and various analog-to-digital converters, digital-to-analog converters, and other support circuits and/or combinations of the foregoing. Control and signal processing functions of the system are allocated between these processing devices according to their respective capabilities. The processing device may include functionality to operate one or more software programs based on computer-readable instructions thereof, which may be stored in a memory device.

The computer readable instructions 140 of the user computing system 101 may comprise a hybrid desktop application 142, which may include executable code for various commands, functions, and components used to accomplish the entity's objectives. The hybrid desktop application 142 may be configured to access one or more components which are stored within the memory device 136 of the user computing system 101 ("desktop components"), along with one or more components which may be stored on the web server computing system 102 ("web-based components"). In this regard, the hybrid desktop application 142 may contain executable code for a graphical user interface configured to display the desktop components and the web-based components in separated sections (e.g., tabs) within a unitary application interface.

The user computing system 101 may further comprise a user interface through which the user 103 may provide inputs to and receive outputs from the user computing system 101. In this regard, the user interface may comprise one or more input devices (e.g., a keyboard, keypad, microphone, mouse, tracking device, biometric readers, capacitive sensors, or the like) and/or output devices (e.g., a display such as a monitor, projector, headset, touchscreen, and/or auditory output devices such as speakers, headphones, or the like).

The web server computing system 102 may be a computing system that hosts one or more web-based applications which may be displayed within the hybrid desktop application 142 of the user computing system 101. In this regard, the web server computing system 102 may be a networked server, terminal, or other type of computing system. Accordingly, the web server computing system 102 may comprise a processing device 154 operatively coupled to a processing device 154 and a memory device 156 such that the web server computing system 102 uses the communication device 152 to communicate with the network and other devices on the network, such as, but not limited to the user computing system 101. In this regard, the communication device 152 generally comprises a modem, antennae, WiFi or Ethernet adapter, radio transceiver, or other device for communicating with other devices on the network.

The memory device 156 may have computer-readable instructions 160 stored thereon, where the computer readable instructions 160 further comprises a web application 162. The web application 162 may be an application which may be presented as a web page accessible by the user 103 through the hybrid desktop application 142. For instance, the web application 162 may be displayed on a tab within the graphical user interface of the hybrid desktop application 142. In this regard, the hybrid desktop application 142 may access the data processed by the web application 162, and conversely, the web application 162 may access the data processed by the hybrid desktop application 142.

The communication devices as described herein may comprise a wireless local area network (WLAN) such as WiFi based on the Institute of Electrical and Electronics Engineers' (IEEE) 802.11 standards, Bluetooth short-wavelength UHF radio waves in the ISM band from 2.4 to 2.485 GHz or other wireless access technology. Alternatively or in addition to the wireless interface, the computing systems may also include a communication interface device that may be connected by a hardwire connection to the resource distribution device. The interface device may comprise a connector such as a USB, SATA, PATA, SAS or other data connector for transmitting data to and from the respective computing system.

The computing systems described herein may each further include a processing device communicably coupled to devices as a memory device, output devices, input devices, a network interface, a power source, a clock or other timer, a camera, a positioning system device, a gyroscopic device, one or more chips, and the like.

In some embodiments, the computing systems may access one or more databases or datastores (not shown) to search for and/or retrieve information related to the service provided by the entity. The computing systems may also access a memory and/or datastore local to the various computing systems within the operating environment 100.

The processing devices as described herein may include functionality to operate one or more software programs or applications, which may be stored in the memory device. For example, a processing device may be capable of operating a connectivity program, such as a web browser application. In this way, the computing systems may transmit and receive web content, such as, for example, product valuation, service agreements, location-based content, and/or other web page content, according to a Wireless Application Protocol (WAP), Hypertext Transfer Protocol (HTTP), and/or the like.

A processing device may also be capable of operating applications. The applications may be downloaded from a server and stored in the memory device of the computing systems. Alternatively, the applications may be pre-installed and stored in a memory in a chip.

The chip may include the necessary circuitry to provide integration within the devices depicted herein. Generally, the chip will include data storage which may include data associated with the service that the computing systems may be communicably associated therewith. The chip and/or data storage may be an integrated circuit, a microprocessor, a system-on-a-chip, a microcontroller, or the like. In this way, the chip may include data storage. Of note, it will be apparent to those skilled in the art that the chip functionality may be incorporated within other elements in the devices. For instance, the functionality of the chip may be incorporated within the memory device and/or the processing device. In a particular embodiment, the functionality of the chip is incorporated in an element within the devices. Still further, the chip functionality may be included in a removable storage device such as an SD card or the like.

A processing device may be configured to use the network interface to communicate with one or more other devices on a network. In this regard, the network interface may include an antenna operatively coupled to a transmitter and a receiver (together a "transceiver"). The processing device may be configured to provide signals to and receive signals from the transmitter and receiver, respectively. The signals may include signaling information in accordance with the air interface standard of the applicable cellular system of the wireless telephone network that may be part of the network. In this regard, the computing systems may be configured to operate with one or more air interface standards, communication protocols, modulation types, and access types. By way of illustration, the devices may be configured to operate in accordance with any of a number of first, second, third, fourth, and/or fifth-generation communication protocols and/or the like. For example, the computing systems may be configured to operate in accordance with second-generation (2G) wireless communication protocols IS-136 (time division multiple access (TDMA)), GSM (global system for mobile communication), and/or IS-95 (code division multiple access (CDMA)), or with third-generation (3G) wireless communication protocols, such as Universal Mobile Telecommunications System (UMTS), CDMA2000, wideband CDMA (WCDMA) and/or time division-synchronous CDMA (TD-SCDMA), with fourth-generation (4G) wireless communication protocols, with fifth-generation (5G) wireless communication protocols, or the like. The devices may also be configured to operate in accordance with non-cellular communication mechanisms, such as via a wireless local area network (WLAN) or other communication/data networks.

The network interface may also include an application interface in order to allow a user or service provider to execute some or all of the above-described processes. The application interface may have access to the hardware, e.g., the transceiver, and software previously described with respect to the network interface. Furthermore, the application interface may have the ability to connect to and communicate with an external data storage on a separate system within the network.

The devices may have an interface that includes user output devices and/or input devices. The output devices may include a display (e.g., a liquid crystal display (LCD) or the like) and a speaker or other audio device, which are operatively coupled to the processing device. The input devices, which may allow the devices to receive data from a user, may include any of a number of devices allowing the devices to receive data from a user, such as a keypad, keyboard, touch-screen, touchpad, microphone, mouse, joystick, other pointer device, button, soft key, and/or other input device(s).

The devices may further include a power source. Generally, the power source is a device that supplies electrical energy to an electrical load. In some embodiment, power source may convert a form of energy such as solar energy, chemical energy, mechanical energy, or the like to electrical energy. Generally, the power source may be a battery, such as a lithium battery, a nickel-metal hydride battery, or the like, that is used for powering various circuits, e.g., the transceiver circuit, and other devices that are used to operate the devices. Alternatively, the power source may be a power adapter that can connect a power supply from a power outlet to the devices. In such embodiments, a power adapter may be classified as a power source "in" the devices.

As described above, the computing devices as shown in FIG. 1 may also include a memory device operatively coupled to the processing device. As used herein, "memory" may include any computer readable medium configured to store data, code, or other information. The memory device may include volatile memory, such as volatile Random Access Memory (RAM) including a cache area for the temporary storage of data. The memory device may also include non-volatile memory, which can be embedded and/or may be removable. The non-volatile memory may additionally or alternatively include an electrically erasable programmable read-only memory (EEPROM), flash memory or the like.

The memory device may store any of a number of applications or programs which comprise computer-executable instructions/code executed by the processing device to implement the functions of the devices described herein.

The computing systems may further comprise a gyroscopic device. The positioning system, input device, and the gyroscopic device may be used in correlation to identify phases within a service term.

Each computing system may also have a control system for controlling the physical operation of the device. The control system may comprise one or more sensors for detecting operating conditions of the various mechanical and electrical systems that comprise the computing systems or of the environment in which the computing systems are used. The sensors may communicate with the processing device to provide feedback to the operating systems of the device. The control system may also comprise metering devices for measuring performance characteristics of the computing systems. The control system may also comprise controllers such as programmable logic controllers (PLC), proportional integral derivative controllers (PID) or other machine controllers. The computing systems may also comprise various electrical, mechanical, hydraulic or other systems that perform various functions of the computing systems. These systems may comprise, for example, electrical circuits, motors, compressors, or any system that enables functioning of the computing systems.

FIG. 2 illustrates a process flow 200 for the hybrid computing application system, in accordance with some embodiments of the present disclosure. The process 200 begins at block 201, where the system presents, on a display of a user computing system, a graphical interface of a hybrid application. The hybrid application may be an application that is being transitioned from one operating environment to another. For instance, the functions of a particularly large application designed to operate in a desktop (e.g., local) environment may, over a period of time, be migrated such that the application operates within a web-based (e.g., remote) environment. In this regard, the some functions of the hybrid application may be implemented as desktop applications (or "desktop components") while other functions may be implemented as web-based applications (or "web-based components"). In this way, by accessing the hybrid application, a user may be able to use desktop applications and web-based applications to access all of the functions of the hybrid application at all stages of the application migration process. In an exemplary embodiment, the hybrid application may be a customer account management tool, where the user may be an employee or agent of an entity such as a financial institution.

The process continues to block 202, where the system receives, from the user computing system, a request to access a first function of the hybrid application. In this regard, the user may interact with the graphical user interface of the hybrid application to select an interface element (e.g., clickable button, link, menu item, or the like) corresponding with the function that the user wishes to access. Continuing the above example, the user may wish to access a transaction history of a particular customer. In such a scenario, the user may click a menu button corresponding with a transaction history application.

The process continues to block 203, where the system presents, on the graphical interface of the hybrid application, a first tab, wherein the first tab comprises a desktop application associated with the first function of the hybrid application. In this regard, the first function of the hybrid application may be implemented using desktop components. Accordingly, the first tab may comprise a panel or window within the graphical user interface which may be populated with the interface elements of the desktop application. Continuing the above example, the application which provides the transaction history functions (e.g., the transaction history application) may be a desktop application. Accordingly, the user may interact with the elements of the transaction history application (e.g., text fields, tables, clickable hyperlinks, and the like) within the first tab to view a customer's transaction history.

The process continues to block 204, where the system receives, from the user computing system, a request to access a second function of the hybrid application. Once again, the user may interact with an element within the graphical user interface of the hybrid application corresponding to the second function. For example, if the user wishes to launch a contact information application which displays contact information for a particular customer, the user may select a button or menu entry within the hybrid application to launch the contact information application. In other embodiments, the user may interact with an element within the first tab (e.g., an element within the desktop application) which may automatically cause the second function to be executed. For instance, the user may click on an account number of a particular customer within the transaction history application, where the account number may include an interactive link to automatically launch a communication application (e.g., a telephony application) to contact the customer associated with the account number.

The process concludes at block 205, where the system presents, on the graphical interface of the hybrid application, a second tab, wherein the second tab comprises a web-based application associated with the second function of the hybrid application. In such embodiments, the second function of the hybrid application may be implemented using a web-based component. For example, the web-based component may be an application which is hosted on a web site running on a remote web server. In this regard, the hybrid application may be configured to run an embedded web browser within the second tab of the graphical interface. To continue the above example, the user may click an interactive link within the first tab which automatically causes the hybrid application to display the second tab comprising the web application (e.g., the web-based telephony application).

In some embodiments, the user may request to perform an action within the second tab (e.g., a third function of the hybrid application) that may require another application (e.g., a desktop application) to be launched. In such an embodiment, the additional application, whether the additional application is desktop or web-based, may be presented in an additional tab within the graphical user interface. In this way, the system may allow the user to seamlessly switch back and forth from desktop and web-based applications within a unitary graphical interface. Accordingly, the functionality of the hybrid application may be maintained independently of the status of the application migration.

In some embodiments, web applications (e.g., the web application within the second tab) may automatically retrieve data from desktop applications to execute its processes. For example, the telephony application may automatically pre-populate items within the second tab (e.g., a telephone number) based on the user clicking a customer's name within the first tab. Conversely, desktop applications (e.g., the desktop application within the first tab) may automatically retrieve data from the web applications to execute its processes. For instance, a record of a transaction that exists within a web application may automatically be imported into the transaction history application which is running in a desktop environment.

In some embodiments, the hybrid application may comprise multiple different embedded web browsers which may be dynamically switched based on the web application to be loaded by the hybrid application. For instance, a first web application may only be fully compatible with a first web browser, whereas a second web application may only be fully compatible with a second web browser. In such embodiments, the system may comprise a web application lookup database which may comprise data entries for each web application to be executed by the hybrid application along with the web browser associated with the web application. Based on the lookup database, the system may automatically, upon executing a particular web application, select and load the web browser associated with the web application. In other embodiments, the system may automatically select a web browser based on metadata associated with the web application. In this way, the web application may always be presented within the hybrid application in the most functional and compatible way possible.

Each communication interface described herein generally includes hardware, and, in some instances, software, that enables the computer system, to transport, send, receive, and/or otherwise communicate information to and/or from the communication interface of one or more other systems on the network. For example, the communication interface of the user input system may include a wireless transceiver, modem, server, electrical connection, and/or other electronic device that operatively connects the user input system to another system. The wireless transceiver may include a radio circuit to enable wireless transmission and reception of information.

As will be appreciated by one of ordinary skill in the art, the present invention may be embodied as an apparatus (including, for example, a system, a machine, a device, a computer program product, and/or the like), as a method (including, for example, a business process, a computer-implemented process, and/or the like), or as any combination of the foregoing. Accordingly, embodiments of the present invention may take the form of an entirely software embodiment (including firmware, resident software, micro-code, and the like), an entirely hardware embodiment, or an embodiment combining software and hardware aspects that may generally be referred to herein as a "system." Furthermore, embodiments of the present invention may take the form of a computer program product that includes a computer-readable storage medium having computer-executable program code portions stored therein.

As the phrase is used herein, a processor may be "configured to" perform a certain function in a variety of ways, including, for example, by having one or more general-purpose circuits perform the function by executing particular computer-executable program code embodied in computer-readable medium, and/or by having one or more application-specific circuits perform the function.

It will be understood that any suitable computer-readable medium may be utilized. The computer-readable medium may include, but is not limited to, a non-transitory computer-readable medium, such as a tangible electronic, magnetic, optical, infrared, electromagnetic, and/or semiconductor system, apparatus, and/or device. For example, in some embodiments, the non-transitory computer-readable medium includes a tangible medium such as a portable computer diskette, a hard disk, a random access memory (RAM), a read-only memory (ROM), an erasable programmable read-only memory (EEPROM or Flash memory), a compact disc read-only memory (CD-ROM), and/or some other tangible optical and/or magnetic storage device. In other embodiments of the present invention, however, the computer-readable medium may be transitory, such as a propagation signal including computer-executable program code portions embodied therein.

It will also be understood that one or more computer-executable program code portions for carrying out the specialized operations of the present invention may be required on the specialized computer include object-oriented, scripted, and/or unscripted programming languages, such as, for example, Java, Perl, Smalltalk, C++, SAS, SQL, Python, Objective C, and/or the like. In some embodiments, the one or more computer-executable program code portions for carrying out operations of embodiments of the present invention are written in conventional procedural programming languages, such as the "C" programming languages and/or similar programming languages. The computer program code may alternatively or additionally be written in one or more multi-paradigm programming languages, such as, for example, F #.

Embodiments of the present invention are described above with reference to flowcharts and/or block diagrams. It will be understood that steps of the processes described herein may be performed in orders different than those illustrated in the flowcharts. In other words, the processes represented by the blocks of a flowchart may, in some embodiments, be in performed in an order other that the order illustrated, may be combined or divided, or may be performed simultaneously. It will also be understood that the blocks of the block diagrams illustrated, in some embodiments, merely conceptual delineations between systems and one or more of the systems illustrated by a block in the block diagrams may be combined or share hardware and/or software with another one or more of the systems illustrated by a block in the block diagrams. Likewise, a device, system, apparatus, and/or the like may be made up of one or more devices, systems, apparatuses, and/or the like. For example, where a processor is illustrated or described herein, the processor may be made up of a plurality of microprocessors or other processing devices which may or may not be coupled to one another. Likewise, where a memory is illustrated or described herein, the memory may be made up of a plurality of memory devices which may or may not be coupled to one another.

It will also be understood that the one or more computer-executable program code portions may be stored in a transitory or non-transitory computer-readable medium (e.g., a memory, and the like) that can direct a computer and/or other programmable data processing apparatus to function in a particular manner, such that the computer-executable program code portions stored in the computer-readable medium produce an article of manufacture, including instruction mechanisms which implement the steps and/or functions specified in the flowchart(s) and/or block diagram block(s).

The one or more computer-executable program code portions may also be loaded onto a computer and/or other programmable data processing apparatus to cause a series of operational steps to be performed on the computer and/or other programmable apparatus. In some embodiments, this produces a computer-implemented process such that the one or more computer-executable program code portions which execute on the computer and/or other programmable apparatus provide operational steps to implement the steps specified in the flowchart(s) and/or the functions specified in the block diagram block(s). Alternatively, computer-implemented steps may be combined with operator and/or human-implemented steps in order to carry out an embodiment of the present invention.

While certain exemplary embodiments have been described and shown in the accompanying drawings, it is to be understood that such embodiments are merely illustrative of, and not restrictive on, the broad invention, and that this invention not be limited to the specific constructions and arrangements shown and described, since various other changes, combinations, omissions, modifications and substitutions, in addition to those set forth in the above paragraphs, are possible. Those skilled in the art will appreciate that various adaptations and modifications of the just described embodiments can be configured without departing from the scope and spirit of the invention. Therefore, it is to be understood that, within the scope of the appended claims, the invention may be practiced other than as specifically described herein.

What is claimed is:

1. A system for a hybrid computing application with desktop and web-based components, the system comprising:
a memory device with computer-readable program code stored thereon;
a communication device; and
a processing device operatively coupled to the memory device and the communication device, wherein the processing device is configured to execute the computer-readable program code to:

present, on a display of a user computing system, a graphical interface of a hybrid application;
receive, from the user computing system, a request to access a first function of the hybrid application;
present, on the graphical interface of the hybrid application, a first tab, wherein the first tab comprises a first panel within the graphical interface that is populated with one or more interface elements of a desktop application associated with the first function of the hybrid application;
receive, from the user computing system, a request to access a second function of the hybrid application; and
present, on the graphical interface of the hybrid application, a second tab, wherein the second tab comprises a second panel within the graphical interface that is populated with one or more interface elements of a web-based application associated with the second function of the hybrid application.

2. The system according to claim 1, wherein the computer-readable program code further causes the processing device to:
detect user activity within the second tab, wherein the user activity is associated with a third function of the hybrid application; and
present, on the graphical interface of the hybrid application, a third tab, wherein the third tab comprises a desktop application associated with the third function of the hybrid application.

3. The system according to claim 2, wherein the user activity within the second tab comprises interacting with an interface element within the second tab.

4. The system according to claim 1, wherein the web-based application associated with the second function of the hybrid application is configured to access data from the desktop application associated with the first function of the hybrid application, wherein the web-based application automatically populates one or more data fields within the second tab using the data from the desktop application.

5. The system according to claim 1, wherein the desktop application associated with the first function of the hybrid application is configured to access data from the web-based application associated with the second function of the hybrid application, wherein the desktop application automatically populates one or more data fields within the first tab using the data from the web-based application.

6. The system according to claim 1, wherein presenting the second tab comprises:
detecting that the web-based application associated with the second function of the hybrid application is only compatible with a first web browser;
switching an embedded web browser of the hybrid application to the first web browser; and
automatically loading the web-based application in the embedded web browser.

7. The system according to claim 6, wherein detecting that the web-based application is compatible with the first web browser comprises accessing a web application lookup database, wherein the web application lookup database indicates that the web-based application is compatible with the first web browser.

8. A computer program product for a hybrid computing application with desktop and web-based components, the computer program product comprising at least one non-transitory computer readable medium having computer-readable program code portions embodied therein, the computer-readable program code portions comprising executable code portions for:
presenting, on a display of a user computing system, a graphical interface of a hybrid application;
receiving, from the user computing system, a request to access a first function of the hybrid application;
presenting, on the graphical interface of the hybrid application, a first tab, wherein the first tab comprises a first panel within the graphical interface that is populated with one or more interface elements of a desktop application associated with the first function of the hybrid application;
receiving, from the user computing system, a request to access a second function of the hybrid application; and
presenting, on the graphical interface of the hybrid application, a second tab, wherein the second tab comprises a second panel within the graphical interface that is populated with one or more interface elements of a web-based application associated with the second function of the hybrid application.

9. The computer program product according to claim 8, wherein the computer-readable program code portions further comprise executable code portions for:
detecting user activity within the second tab, wherein the user activity is associated with a third function of the hybrid application; and
presenting, on the graphical interface of the hybrid application, a third tab, wherein the third tab comprises a desktop application associated with the third function of the hybrid application.

10. The computer program product according to claim 9, wherein the user activity within the second tab comprises interacting with an interface element within the second tab.

11. The computer program product according to claim 8, wherein the web-based application associated with the second function of the hybrid application is configured to access data from the desktop application associated with the first function of the hybrid application, wherein the web-based application automatically populates one or more data fields within the second tab using the data from the desktop application.

12. The computer program product according to claim 8, wherein the desktop application associated with the first function of the hybrid application is configured to access data from the web-based application associated with the second function of the hybrid application, wherein the desktop application automatically populates one or more data fields within the first tab using the data from the web-based application.

13. The computer program product according to claim 8, wherein presenting the second tab comprises:
detecting that the web-based application associated with the second function of the hybrid application is only compatible with a first web browser;
switching an embedded web browser of the hybrid application to the first web browser; and
automatically loading the web-based application in the embedded web browser.

14. A computer-implemented method for a hybrid computing application with desktop and web-based components, wherein the computer-implemented method comprises:
presenting, on a display of a user computing system, a graphical interface of a hybrid application;
receiving, from the user computing system, a request to access a first function of the hybrid application;

presenting, on the graphical interface of the hybrid application, a first tab, wherein the first tab comprises a first panel within the graphical interface that is populated with one or more interface elements of a desktop application associated with the first function of the hybrid application;

receiving, from the user computing system, a request to access a second function of the hybrid application; and presenting, on the graphical interface of the hybrid application, a second tab, wherein the second tab comprises a second panel within the graphical interface that is populated with one or more interface elements of a web-based application associated with the second function of the hybrid application.

15. The computer-implemented method according to claim 14, wherein the computer-implemented method further comprises:
    detecting user activity within the second tab, wherein the user activity is associated with a third function of the hybrid application; and
    presenting, on the graphical interface of the hybrid application, a third tab, wherein the third tab comprises a desktop application associated with the third function of the hybrid application.

16. The computer-implemented method according to claim 15, wherein the user activity within the second tab comprises interacting with an interface element within the second tab.

17. The computer-implemented method according to claim 14, wherein the web-based application associated with the second function of the hybrid application is configured to access data from the desktop application associated with the first function of the hybrid application, wherein the web-based application automatically populates one or more data fields within the second tab using the data from the desktop application.

18. The computer-implemented method according to claim 14, wherein the desktop application associated with the first function of the hybrid application is configured to access data from the web-based application associated with the second function of the hybrid application, wherein the desktop application automatically populates one or more data fields within the first tab using the data from the web-based application.

19. The computer-implemented method according to claim 14, wherein presenting the second tab comprises:
    detecting that the web-based application associated with the second function of the hybrid application is only compatible with a first web browser;
    switching an embedded web browser of the hybrid application to the first web browser; and
    automatically loading the web-based application in the embedded web browser.

20. The computer-implemented method according to claim 19, wherein detecting that the web-based application is compatible with the first web browser comprises accessing a web application lookup database, wherein the web application lookup database indicates that the web-based application is compatible with the first web browser.

* * * * *